United States Patent
Courtney et al.

(10) Patent No.: US 8,204,085 B1
(45) Date of Patent: Jun. 19, 2012

(54) VIRTUAL CONCATENATION FOR PARALLEL DATA STREAMS

(75) Inventors: John Courtney, Carrickfergus (GB); Mark Matthews, Brentwood (GB); Mark Carson, Belfast (GB)

(73) Assignee: Ciena Corporation, Linthicum, MD (US)

(*) Notice: Subject to any disclaimer, the term of this patent is extended or adjusted under 35 U.S.C. 154(b) by 1441 days.

(21) Appl. No.: 10/734,968

(22) Filed: Dec. 15, 2003

(51) Int. Cl.
 - *H04J 3/04* (2006.01)
 - *H04J 3/06* (2006.01)
 - *H04J 3/24* (2006.01)

(52) U.S. Cl. ........ 370/536; 370/539; 370/508; 370/474; 370/395.51; 370/907

(58) Field of Classification Search .................. 370/542, 370/510, 512, 535–541, 474, 395.62, 517, 370/395.21, 503, 395.51, 507–509, 350, 370/466, 907
See application file for complete search history.

(56) References Cited

U.S. PATENT DOCUMENTS

| | | | | |
|---|---|---|---|---|
| 5,970,067 A * | 10/1999 | Sathe et al. | ...... | 370/394 |
| 6,633,584 B1 * | 10/2003 | Russell et al. | ...... | 370/466 |
| 6,667,993 B1 * | 12/2003 | Lippett et al. | ...... | 370/509 |
| 6,731,656 B1 * | 5/2004 | Slater et al. | ...... | 370/536 |
| 6,842,455 B1 * | 1/2005 | Heuer | ...... | 370/393 |
| 6,842,787 B2 * | 1/2005 | Stadler et al. | ...... | 709/231 |
| 6,847,655 B2 * | 1/2005 | Colombo et al. | ...... | 370/474 |
| 6,917,630 B1 * | 7/2005 | Russell et al. | ...... | 370/532 |
| 7,058,056 B2 * | 6/2006 | Yehuda et al. | ...... | 370/394 |
| 7,103,278 B2 * | 9/2006 | Traverso | ...... | 398/79 |
| 7,164,688 B2 * | 1/2007 | Grimbergen | ...... | 370/412 |
| 7,193,964 B2 * | 3/2007 | Courtney et al. | ...... | 370/228 |
| 7,298,744 B1 * | 11/2007 | Suh et al. | ...... | 370/393 |
| 7,305,013 B2 * | 12/2007 | Kfir et al. | ...... | 370/516 |
| 7,424,036 B1 * | 9/2008 | Alexander et al. | ...... | 370/474 |
| 7,453,881 B2 * | 11/2008 | Tzannes et al. | ...... | 370/395.1 |
| 7,539,196 B2 * | 5/2009 | Flavin et al. | ...... | 370/394 |
| 2002/0006128 A1 * | 1/2002 | Yehuda et al. | ...... | 370/390 |
| 2002/0176356 A1 * | 11/2002 | Courtney et al. | ...... | 370/216 |
| 2003/0002779 A1 * | 1/2003 | Bobin et al. | ...... | 385/17 |
| 2003/0007513 A1 * | 1/2003 | Barker et al. | ...... | 370/476 |
| 2003/0007519 A1 * | 1/2003 | Murton et al. | ...... | 370/539 |
| 2003/0043861 A1 * | 3/2003 | Saito | ...... | 370/539 |
| 2003/0165115 A1 * | 9/2003 | Sutoh et al. | ...... | 370/216 |
| 2003/0202540 A1 * | 10/2003 | kfir et al. | ...... | 370/498 |
| 2004/0001519 A1 * | 1/2004 | Fisher et al. | ...... | 370/535 |
| 2004/0213268 A1 * | 10/2004 | Gupta et al. | ...... | 370/395.51 |
| 2004/0213299 A1 * | 10/2004 | Gupta et al. | ...... | 370/539 |

* cited by examiner

*Primary Examiner* — Kwang B Yao
*Assistant Examiner* — Candal Elpenord
(74) *Attorney, Agent, or Firm* — Christopher & Weisberg, P.A.

(57) ABSTRACT

It is often required to send a plurality of streams of data in parallel between two network nodes in a synchronous transmission network and also to maintain a particular alignment between those streams of data. This is particularly required when the streams of data are to be transmitted over a wide area network, for example, for data mirroring applications. Virtual concatenation is used for each of the individual data streams as known in the art and in addition, the individual virtual concatenation processes are synchronized or co-ordinated. At a destination node it is then possible to realign the individual data streams with respect to one another.

17 Claims, 4 Drawing Sheets

VIRTUAL CONCATENATION FOR PARALLEL DATA STREAMS

FIELD OF THE INVENTION

The present invention relates to synchronous transmission networks and particularly, although not exclusively, to a method and apparatus for transporting a plurality of streams of data in parallel between nodes in such a network.

BACKGROUND TO THE INVENTION

SDH and SONET are both examples of protocols suitable for use in sending data over synchronous transmission networks. Such networks comprise a plurality of network elements (also referred to as nodes) connected together by optical fibre or any other suitable type of connection. Each node comprises a synchronous transmission apparatus, or network equipment, in the form of, for example, a multiplexer, a cross-connect, a regenerator, or other signal processing or switching apparatus. The synchronous transmission apparatus, or network elements, incorporated in the network are typically synchronised (locked in frequency but not in phase) to an overall network clock.

The SONET (Synchronous Optical Network) Standard defined by ANSI (American National Standards Institute) is similar in many respects to the SDH (Synchronous Digital Hierarchy) standard defined by the ITU-T (International Telecommunications Union Telecommunications Standardization Sector).

In particular situations it is required to send a plurality of streams of data in parallel between two network nodes in a synchronous transmission network and also to maintain a particular alignment between those streams of data. For example, a data bus which generates parallel streams of data that must be transported in such a manner that the differential delay between the streams is kept to that which can be tolerated by the system. Otherwise the receiver will be unable to recover the transmitted signal, and the link will either fail, or be forced to operate at a lower bandwidth.

The problem of how to maintain alignment between a plurality of streams of data in this way is exacerbated when the streams of data must be transmitted over long distances such as in a Wide Area Network (WAN). This is because any differential delay experienced will tend to be larger for longer distances. Delays occur due to transmission delays along fiber links and delays within the nodes themselves. Protection switching may also occur in the network, to causing the delay experienced by some, or all, of the streams to change over time.

A typical delay for a STM-1 frame at a node is 90 bytes per VC-4. This gives a lowest time delay per node of the order of 5 μs. Additionally, the delay incurred due to the transmission along optical fiber is of the order of 5 μs per km. Thus, if 2 streams of data are sent across a network by different routes, having a round trip geographical distance difference of 1000 km, the streams could arrive at the same destination 5 ms apart due just to the difference in fiber delay between the two routes. A differential delay between source and destination over a large network of the order of 10 ms may be incurred.

Previously this problem has been addressed by locating the equipment sufficiently close together, such that the differential delays would not exceed that allowed by the equipment, or by employing dedicated 'dark fibre', and ensuring that the lengths of the individual fibres was closely matched.

An alternative approach would be to multiplex all the streams of data into a single serial stream which is demultiplexed when it reaches its destination. However, this approach requires a transport path which operates at a higher bit rate than the sum of the streams to be transported, and that when protection switching occurs, all these paths will be switched simultaneously. These conditions will not always be achievable in a given synchronous network.

OBJECT TO THE INVENTION

The invention seeks to provide a method and apparatus for transporting a plurality of streams of data in parallel between source and destination nodes in a synchronous network which overcomes or at least mitigates one or more of the problems mentioned above.

Further benefits and advantages of the invention will become apparent from a consideration of the following detailed description given with reference to the accompanying drawings, which specify and show preferred embodiments of the invention.

SUMMARY OF THE INVENTION

It is often required to send a plurality of streams of data in parallel between two network nodes in a synchronous transmission network and also to maintain a particular alignment between those streams of data. This is particularly required when the streams of data are to be transmitted over a wide area network, for example, for data mirroring applications. Virtual concatenation is used for each of the individual data streams as known in the art and in addition, the individual virtual concatenation processes are synchronised or co-ordinated. At a destination node it is then possible to realign the individual data streams with respect to one another.

According to an aspect of the invention there is provided a method of transmitting a plurality of data streams in parallel over a synchronous network from a source to a destination said method comprising the steps of:— at said source, using a virtual concatenation process on each of the data streams; and co-ordinating the virtual concatenation process for each of those data streams such that at said destination said data streams may be realigned with respect to one another.

This is particularly advantageous because the plurality of data streams can be transmitted such that they remain aligned at the destination.

Preferably said step of co-ordinating the virtual concatenation process comprises using a separate virtual concatenation processor for each of the data streams. For example, the virtual concatenation processor may be a vmapper as described below or any other suitable type of processor for performing virtual concatenation as known in the art. This provides the advantage that existing virtual concatentation processors can be used without the need for substantial modification.

Advantageously said step of co-ordinating the virtual concatentation process for each data stream is achieved by using a communications link between each of the separate virtual concatentation processors. This provides a simple and effective means by which the separate virtual concatenation processors may be co-ordinated or synchronised.

Preferably, said virtual concatenation process comprises producing a sequence of virtual containers to which a sequence of markers are added and wherein a separate sequence of marked virtual containers are produced for each of the data streams; said sequence of markers being co-ordinated for each of the data streams. For example, the markers comprise multiframe indicators as known in the art of virtual concatentation.

The synchronous network itself is preferably selected from an SDH network and a SONET network although any other type of synchronous network can be used. As mentioned above, the invention gives particular advantages when the source and destination are distributed over a wide area network. Another particular application is where the source and destination are associated with storage devices suitable for use in a data mirroring application.

According to another aspect of the invention there is provided a method of receiving a plurality of data streams at a destination in a synchronous network, said data streams having been transmitted in parallel over the network said method comprising the steps of:— receiving said data streams in virtually concatenated form at said destination; and using marker information associated with the received data streams to realign the data streams with respect to one another.

Preferably said step (i) of receiving said data streams comprises for each data stream, using a plurality of receivers to receive said virtually concatenated data, each receiver having a delay element associated with it. Advantageously, the receivers associated with one of the data streams are co-ordinated with the receivers associated with the other data streams.

Preferably said co-ordination is achieved by using a communications link between said receivers.

Advantageously said delay elements are dynamically adjusted. This provides the ability to vary the delay introduced by the delay elements as required to ensure that the data streams are aligned.

The invention also encompasses an apparatus for transmitting a plurality of data streams in parallel over a synchronous network from a source to a destination said apparatus comprising:— at said source, a plurality of virtual concatenation processors, one for each of the data streams; and a co-ordinator arranged to co-ordinate each of the virtual concatenation processors.

The invention also encompasses an apparatus for receiving a plurality of data streams at a destination in a synchronous network, said data streams having been transmitted in parallel over the network said apparatus comprising:— an input arranged to receive said data streams in virtually concatenated form at said destination; and a processor arranged to use marker information associated with the received data streams to realign the data streams with respect to one another.

According to another aspect of the invention there is provided a synchronous communications network comprising an apparatus of each type mentioned above.

The invention also encompasses computer software stored on a computer readable medium and arranged to control a node in a communications network such that any of the methods mentioned above are carried out.

The preferred features may be combined as appropriate, as would be apparent to a skilled person, and may be combined with any of the aspects of the invention.

BRIEF DESCRIPTION OF THE DRAWINGS

In order to show how the invention may be carried into effect, embodiments of the invention are now described below by way of example only and with reference to the accompanying figures in which:

FIGS. 1a and 1b are schematic diagrams of the phase relationship between a plurality of data streams;

DETAILED DESCRIPTION OF INVENTION

Embodiments of the present invention are described below by way of example only. These examples represent the best ways of putting the invention into practice that are currently known to the Applicant although they are not the only ways in which this could be achieved.

The term "Wide Area Network" (WAN) is used to refer to a communications network distributed over a geographical area spanning hundreds of kilometers or greater. However it is noted that the distinction between a local area network (LAN) and a WAN is becoming increasingly blurred with a LAN having a smaller geographical coverage than a WAN.

Figure 1A:
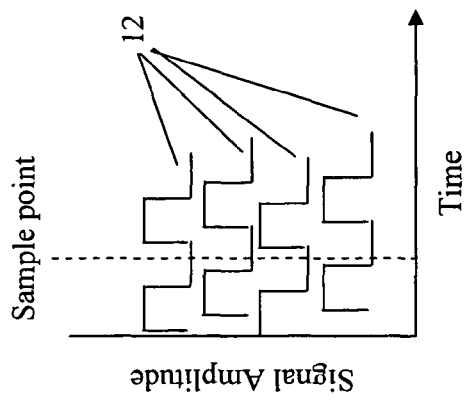
Figure 1:
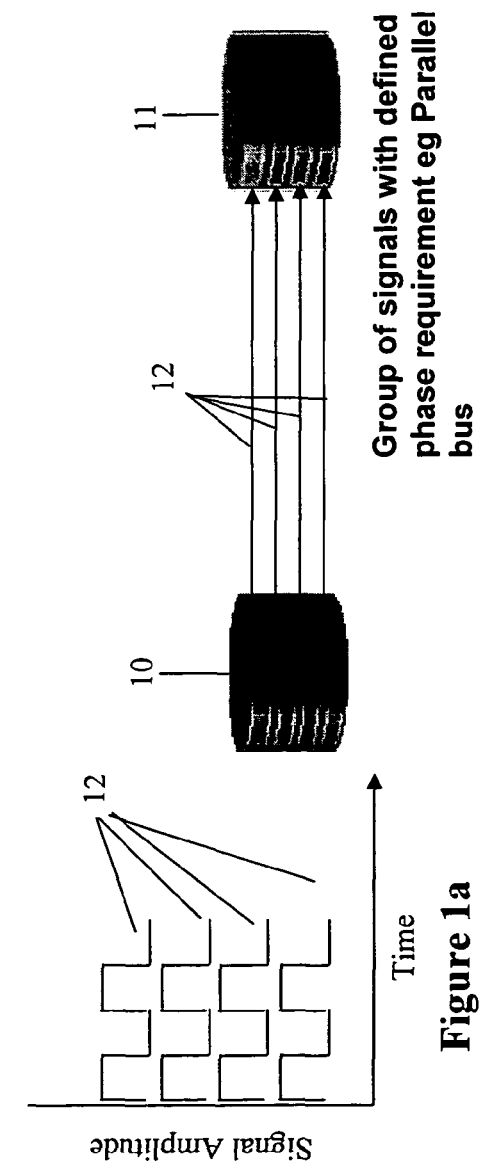
FIG. 1 is a schematic diagram of two nodes in a synchronous network between which a plurality of parallel data streams are transmitted where the alignment of the data streams is to be substantially maintained.

As mentioned above it is often required to send a plurality of streams of data in parallel between two network nodes in a synchronous transmission network and also to maintain a particular alignment between those streams of data. For example, FIG. 1 shows a source 10 and destination 11 within a parallel bus. A plurality of signal streams 12 are transmitted between the source 10 and destination 11 in parallel and these signal streams each have a phase as represented in FIGS. 1a and 1b. On transmission from the source 10 the signals 12 are substantially aligned as shown in FIG. 1a and if differential delay is introduced between the signal streams during transmission to the destination 11 the signal streams become further misaligned with respect to one another as indicated in FIG. 1b. This is a problem for any application where the parallel signal streams need to remain substantially aligned.

Figure 3:
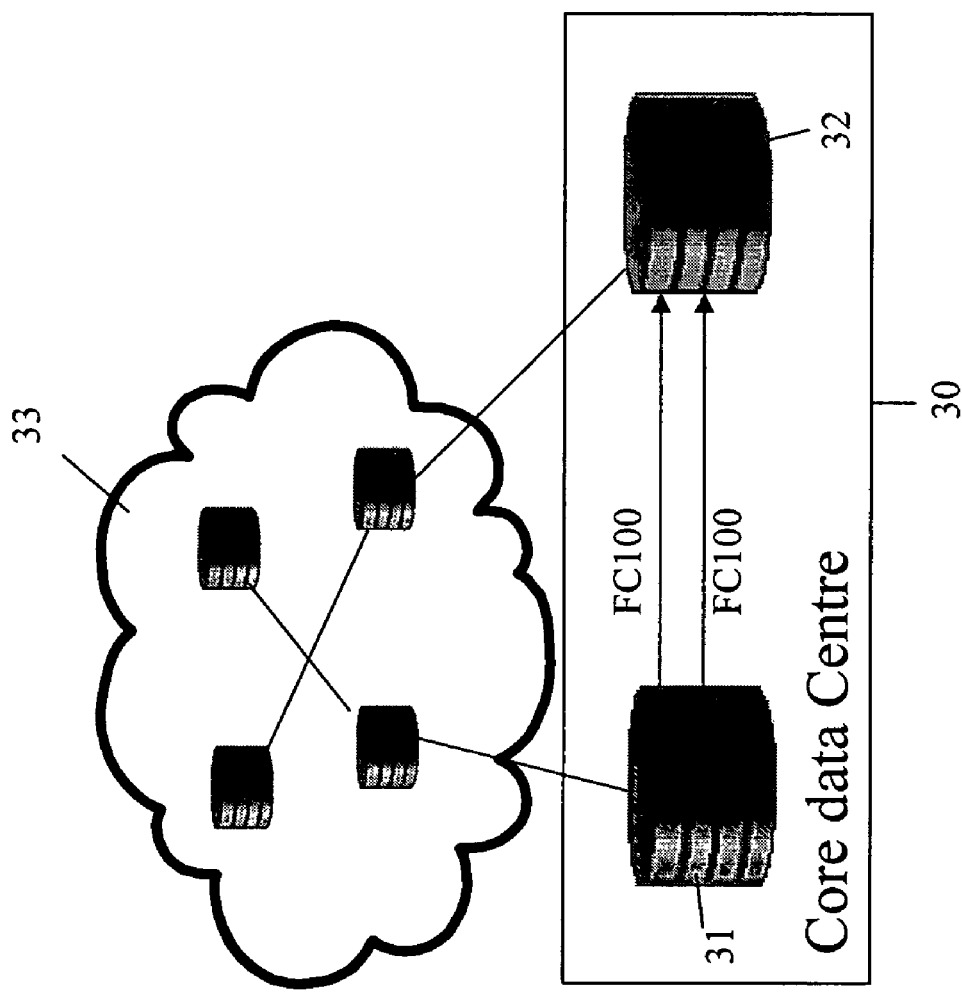
FIG. 3 is a schematic diagram of a synchronous network for use with the present invention in which a core data centre with mirrored storage devices is provided.

For example, consider the situation illustrated in FIG. 3. This shows a core data centre 30 comprising two storage devices 31, 32 which are geographically separated at different locations in a WAN 33. The storage devices 31, 32 both contain the same data so that if one should break down or become inaccessible the other can be used instead. In order that the data at the two storage devices 31, 32 always matches information must be transferred between them. Typically this is done using a trunking group between the two storage devices, that trunking group comprising a plurality of fibres or other connection means, connected between the storage devices in parallel. A typical example would have a group of links operating at a data rate of 1 Gbit/sec. For the link to operate, the differential cable length between members of the trunking group would need to be kept less than 400 m to yield a working solution. However, to ensure an optimal performance i.e. a delay of around 150 ns then the cable lengths should differ by no more than 30 m.

Figure 2:
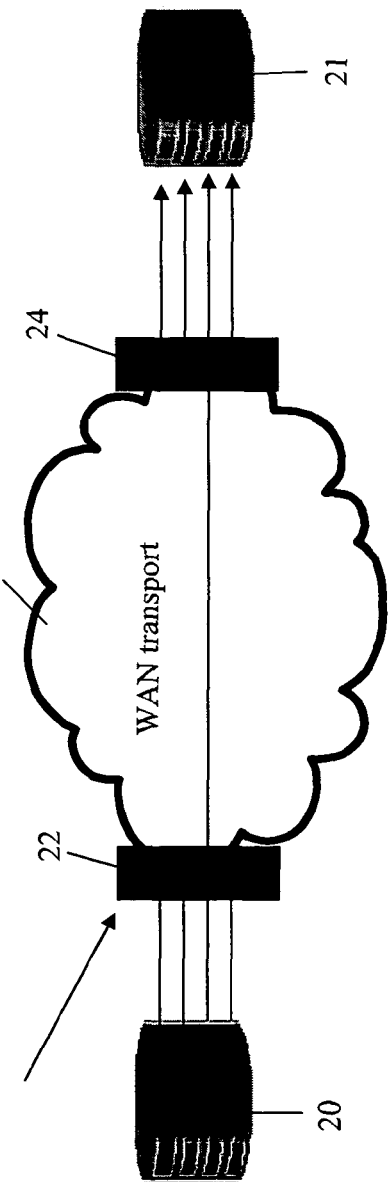
FIG. 2 is a schematic diagram of a prior art arrangement in which a plurality of data streams are multiplexed into a single stream before transmission over a wide area network.

Previously this problem has been addressed by
1) Application of wavelength division multiplex (WDM) techniques in which each constituent signal is carried as a wavelength on the same dark fibre and thereby ensuring that there is no significant differential delay introduced. This solution is not one that can easily be generally applied as dark fibre between any two geographical points is unlikely to be available and is likely to be prohibitively expensive even when available.
2) multiplexing the streams of data into a single serial stream which is then demultiplexed when it reaches its destination. This is illustrated in FIG. 2 which shows a source 20 and destination 21. The source transmits four signal streams in parallel which are multiplexed at a node 22 into a single stream which is transmitted over a WAN 23. The single serial stream is sent over a single path such that all the data frames experience the same delay. Demultiplexing takes place at node 24 before the signals reach the destination 21.

However, this approach does not work when the individual streams themselves run at a high bit rate; that is, a bit rate which is the maximum or about the maximum supported by the network. Also, this multiplexing method becomes infeasible when the number of streams of data to be multiplexed is high such that the maximum bit rate supported by the network is not sufficient.

The present invention recognises the problem of differential delay between parallel streams of data transmitted over a synchronous network and addresses this problem by using virtual concatenation for each individual data stream and in addition coordinating or synchronising the virtual concatenation process for each of the data streams.

It is known to use the process of virtual concatenation in synchronous transmission networks to overcome the problem of variations in delay caused by different frames from the same stream of data being sent over different paths across the network. However, even if each of the data streams are transmitted in parallel using virtual concatenation a different delay between the data streams themselves results. This differential delay is introduced because the streams may be transmitted via different paths through the network. In order to allow for this differential delay the individual virtual concatenation processes for each data stream are coordinated or synchronised. When the frames making up the data streams are received at the destination they are then able to be reordered into the correct sequence, not only within the individual data streams (as per standard virtual concatenation) but also such that the phase alignment between the data streams themselves is maintained.

Figure 4:
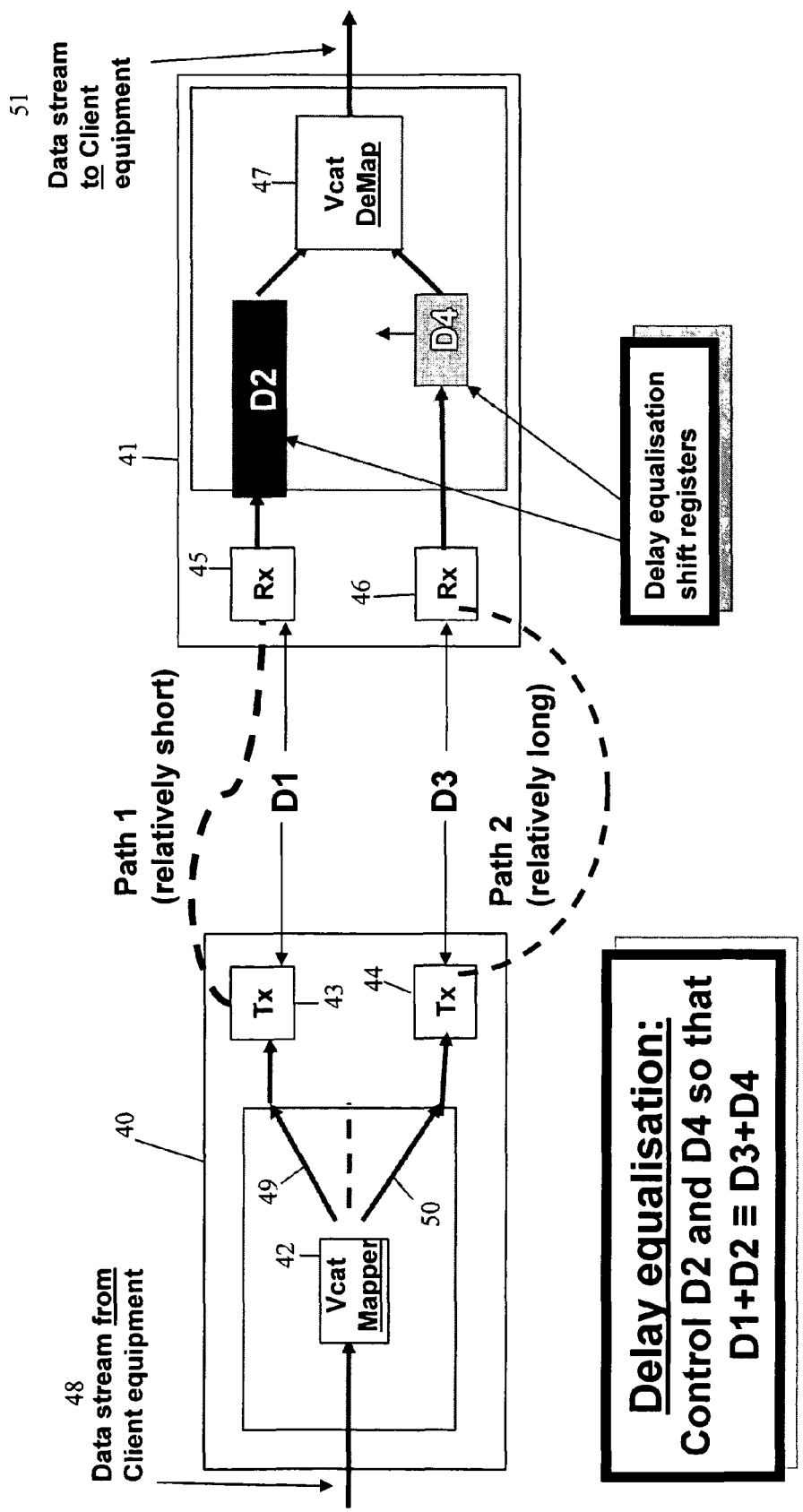
FIG. 4 is a schematic diagram of a prior art virtual concatenation process.

The prior art process of virtual concatenation is now described at a high level with respect to FIG. 4. Full details of this process are known to the skilled person and described in ITU-T G.707/Y.1322 (10/00) or Telcordia GR-253-CORE September 2000. Co-pending U.S. patent application Ser. No. 09/166,814 titled "Concatenation of Containers in Synchronous Digital Hierarchy Network" and U.S. Pat. No. 6,633,584 both assigned to Nortel Networks Limited also describe this process in detail and are both incorporated herein by reference.

The present invention uses this process for each of the parallel streams of data and in addition, ensures that the virtual concatenation process is co-ordinated between those streams.

FIG. 4 shows a source node 40 of a synchronous transmission network connected to a destination node 41 via that network. A plurality of paths across the network exists between the source 40 and destination 41 and two such paths are illustrated labelled 'Path 1' and 'Path 2'. Path 1 is relatively short with respect to Path 2.

The source node comprises a virtual concatenation mapper 42 as well as two transmitters 43, 44 in addition to other components as known in the art. The destination node comprises two receivers, 45, 46, two delay equalisation elements D2, D4 and a virtual concatenation demapper 47.

A single data stream 48 is input to the source node 40 as known in the art and undergoes virtual concatenation. In this example the virtual concatenation process forms two sub-streams of virtually concatenated containers 49, 50. Each of those sub-streams is transmitted over the synchronous network by a respective one of the transmitters 43, 44.

Because Path 1 is shorter than Path 2, the transmission time over Path 1 is shorter than for Path 2. The sub-streams 49, 50 are received at receivers 45, 46 at the destination node and delay elements D2, D4 are used to allow for the difference in transmission delay between Path 1 and Path 2. Thus in this example the delay element D2 introduces a longer delay into the data that travels over path 1 than the delay element D4 does for the data travelling over Path 2.

Once the sub-streams 49, 50 have been aligned as a result of use of the delay element D2, D4 the virtual concatenation process is reversed using demapper 47. This reassembles the data into a single stream 51 for output to client or other equipment.

Figure 5:
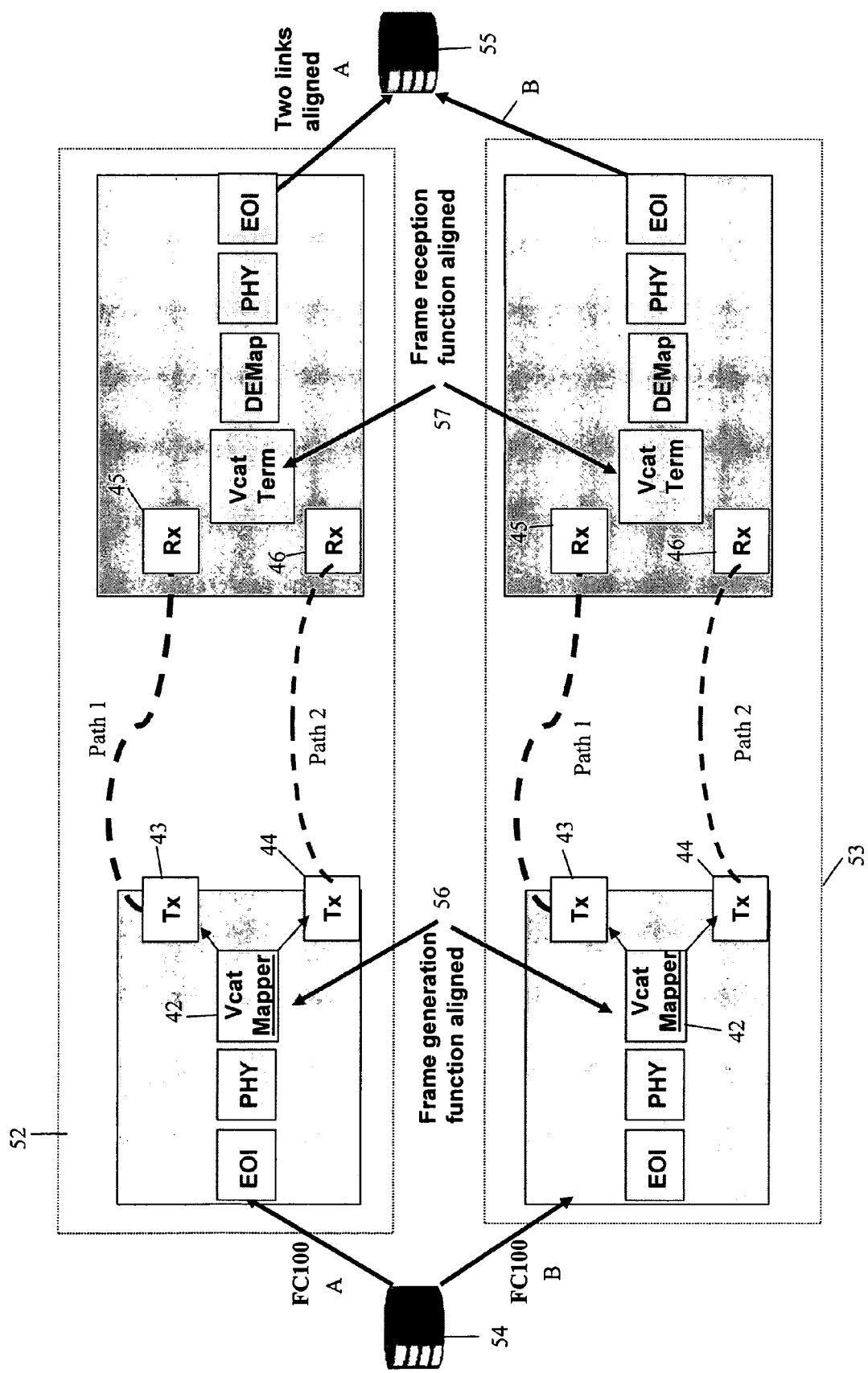
FIG. 5 is a schematic diagram of an apparatus arranged to transmit a plurality of data streams over a synchronous network whilst enabling the alignment of the data streams with respect to one another to be maintained.

FIG. 5 illustrates how the prior art virtual concatenation process of FIG. 4 is extended for use in the present invention. The same reference numerals are used in FIG. 5 to refer to the corresponding components of FIG. 4.

FIG. 5 shows two nodes 54, 55 between which a plurality of streams of data are to be transmitted in parallel over a synchronous network but whilst substantially maintaining signal alignment between the streams of data. The nodes 54, 55 may be storage devices in the case that data mirroring is being achieved. However, the invention encompasses any other application in which signal alignment is to be substantially maintained. In this example only two streams of data A, B are illustrated for reasons of clarity. More streams of data can also be used.

Data stream A is transmitted over the synchronous network using a virtual concatenation process as illustrated in box 52 of FIG. 5. This process is similar to that of FIG. 4. In addition, data stream B is transmitted over the network also using virtual concatenation as illustrated in box 53 of FIG. 5. The containers transmitted between the transmitters 43, 44 and receivers 45, 46 can take any suitable path over the network (i.e. not necessarily the paths labelled Path 1 and Path 2). The components for carrying out this virtual concatenation are the same as those described above with reference to FIG. 4 but with some important modifications.

A frame generation alignment function 56 and a frame reception alignment function 57 are also provided. As mentioned above if each of the data streams A, B are transmitted in parallel using virtual concatenation a different delay between the data streams results. That is there is a misalignment of the data streams when they arrive at node 55. In order to accommodate this and enable the data streams to be realigned once they reach the destination the frame generation alignment function 56 is used. This function 56 acts to synchronise or initialise the virtual concatenation processes of each of the data streams. This ensures that labels or other markers associated with virtual containers produced as a result of the virtual concatenation processes are co-ordinated between each of the data streams. Then at the destination the frame reception alignment function 57 is used to realign the virtual is containers of data stream A with respect to the virtual containers of data stream B.

The process of frame generation alignment is now described in more detail. The virtual concatenation overhead consists of a control string carried in the H4 byte (high order) or K4 bit 2 (low order). This string contains; a multiframe indicator, a sequence identifier and optionally other information including a group identifier. A conventional virtual concatenation source node will inverse multiplex a client signal into a set of separate SONET/SDH payload containers. Each container will have a control string containing the multiframe indicator and sequence identifier, which will allow the receiver to correctly reassemble the original client signal. This is performed according to a method detailed in the standards listed above. In the present invention, two or more client signals are processed as outlined above. The inverse multiplexing function applied to each client is synchronised, such that the multiframe indicators used to generate the inverse multiplex are synchronised between all the clients. As a result, the frame identified with multiframe n and sequence identifier 0 on channel 1, and the frame identified with multiframe n and sequence identifier 0 on channel 2 will have arrived at the transmitter at virtually the same instant.

The process of frame reception alignment is now described in more detail. In a conventional virtual concatenation receiver, the individual, inverse multiplexed, paths will arrive at the receiver with different delays. Delay elements at the receiver (FIGS. 4, D2 & D4) are configured to apply a different delay to each path, such that the individual payload containers emerging from the delay elements will have their multiframe indicators aligned. The receiver can then reconstruct the original client signal by multiplexing the components in the order defined by the sequence identifier. This function is described in the standards listed above. In the present invention, two or more such virtual concatenation receivers are linked. Since the multiframe indicators of the separate clients are synchronised by the transmitter, as described above, the receivers can also be synchronised. As a result the individual delay elements in each of the receivers will be adjusted, such that all the client signals emerge from the delay elements, aligned in time. When the client signals are reconstructed, they will have that same phase relationship between the individual channels that they had when presented to the input of the transmitter.

The alignment of transmitters and receivers may be achieved by combining multiple channels within a single integrated circuit or circuit pack, or the transmitters and receivers may be located on separate circuit packs. In either case, synchronisation is achieved by providing a communications link between the transmitters, and a separate link between the receivers. In the case of the transmitter, synchronisation is static. Once all of the transmitters have been aligned, no further information needs to be passed between them for the system to continue operating. Synchronisation of the receivers is dynamic. As delays within the network change, the configuration of the delay elements must be adjusted to ensure that the multiframe indicators remain aligned at the output of the delay elements. If the delay of the longest path changes, or a new path becomes the longest, then this is communicated to the other virtual concatenation receivers, so that all the output clients remain aligned.

The method described with reference to FIG. 5 is suitable for use with either SDH or SONET or any other protocol for use on a synchronous transmission network.

The invention claimed is:

1. A method of transmitting a plurality of different, aligned, data streams in parallel over a synchronous network from a source to a destination, each data stream transmitted by the source over a different path of the synchronous network, said method comprising the steps of:
at said source,
using a virtual concatenation process on each of the plurality of different, aligned data streams to form a respective plurality of virtually concatenated (VC) data streams each comprising sub-streams of virtually concatenated containers; and
inverse multiplexing each data stream, the inverse multiplexing being synchronized so that multi-frame indicators of each data stream are synchronized to occur substantially at a same time prior to transmission so that, at the destination, each of the data streams is received at a different one of a plurality of receivers, the receivers being dynamically synchronized via a connecting link among the plurality of receivers to compensate for a change in delay in one or more of the different paths.

2. A method as claimed in claim 1 wherein said step of co-ordinating the virtual concatenation process comprises using a separate virtual concatenation processor for each of the data streams.

3. A method as claimed in claim 2 wherein said step of co-ordinating the virtual concatenation process for each data stream is achieved by using a communications link between each of the separate virtual concatenation processors.

4. A method as claimed in claim 1 wherein said synchronous network is selected from an SDH network and a SONET network.

5. A method as claimed in claim 1 wherein said source and said destination are distributed over a wide area network.

6. A method as claimed in claim 1 wherein said source and said destination are associated with storage devices suitable for use in a data mirroring application.

7. A method as claimed in claim 1 wherein the bit rate of said VC data streams is about the same as or greater than the bit rate supported by the synchronous network.

8. The method of claim 1, wherein the dynamic synchronization includes transmitting the change in delay from one receiver to the other receivers of the plurality of receivers.

9. A method of receiving a plurality of different, aligned data streams at a destination in a synchronous network, each data stream having been generated by inverse multiplexing in which the inverse multiplexing is synchronized so that multiframe indicators of each data stream are synchronized to occur substantially at a same time prior to transmission, and each data stream having been transmitted as a separate virtually concatenated (VC) data stream, said VC data streams having been transmitted in parallel over a different path of the network, said method comprising the steps of: receiving said VC data streams each in the form of sub-streams of virtually concatenated containers at said destination, each of a plurality of receivers receiving a different one of the VC data streams; dynamically synchronizing the plurality of receivers via a connecting link among the plurality of receivers to compensate for a change in delay in one or more of the different paths.

10. A computer readable non-transitory medium encoded with computer executable instructions and arranged to control a node in a communications network such that the method of claim 9 is carried out.

11. The method of claim 9, wherein the dynamic synchronization includes transmitting the change in delay from one receiver to the other receivers of the plurality of receivers.

12. An apparatus for receiving a plurality of different, delayed data streams transmitted in parallel over a synchronous network from a source to a destination, each data stream being transmitted as a separate virtually concatenated (VC) data stream on a different path, and each data stream having been generated by inverse multiplexing in which the inverse multiplexing is synchronized so that multi-frame indicators of the data streams are synchronized to occur substantially at a same time prior to transmission, the apparatus comprising: a plurality of receivers to receive each of the data streams, the receivers being dynamically synchronized via a connecting link among the plurality of receivers to compensate for a change in delay in one or more of the different paths.

13. An apparatus as claimed in claim 12 wherein the data streams are aligned via a communications link between a plurality of virtual concatenation processors.

14. An apparatus as claimed in claim 12 which is provided as either of an integrated circuit and a circuit pack.

15. The apparatus of claim 12, wherein a change in delay along a path to one receiver is communicated to at least one other receiver of the plurality of receivers.

16. An apparatus for receiving a plurality of different, aligned data streams at a destination in a synchronous network, each data stream having been generated by inverse multiplexing in which the inverse multiplexing is synchronized so that multi-frame indicators of each data stream are synchronized to occur substantially at a same time prior to transmission, and each data stream having been transmitted as a separate virtually concatenated (VC) data stream, said VC data streams having been transmitted along different paths in parallel over the network, said apparatus comprising: a plurality of receivers, each receiver arranged to receive a different one of the VC data streams, the receivers being dynamically synchronized via a connecting link among the plurality of receivers to compensate for a change in delay in one or more of the different paths.

17. The apparatus of claim 16, wherein a change in delay along a path to one receiver is communicated to at least one other receiver of the plurality of receivers.

* * * * *